United States Patent
Sano et al.

(10) Patent No.: US 11,072,097 B2
(45) Date of Patent: Jul. 27, 2021

(54) METHOD FOR MANUFACTURING LENS FORMING MOLD, METHOD FOR MANUFACTURING EYEGLASS LENS, AND EYEGLASS LENS

(71) Applicant: HOYA LENS THAILAND LTD., Thanyaburi (TH)

(72) Inventors: Yoshio Sano, Tokyo (JP); Hiroshi Shimizu, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 164 days.

(21) Appl. No.: 16/019,208

(22) Filed: Jun. 26, 2018

(65) Prior Publication Data

US 2018/0339432 A1 Nov. 29, 2018

Related U.S. Application Data

(63) Continuation of application No. PCT/JP2017/024208, filed on Jun. 30, 2017.

(30) Foreign Application Priority Data

Jun. 30, 2016 (JP) .............................. JP2016-131088

(51) Int. Cl.
*B29C 33/38* (2006.01)
*B29D 11/00* (2006.01)
*B29K 105/00* (2006.01)

(52) U.S. Cl.
CPC .... *B29C 33/3842* (2013.01); *B29D 11/00413* (2013.01); *B29D 11/00528* (2013.01);
(Continued)

(58) Field of Classification Search
CPC ........ B29D 11/00413; B29D 11/00528; B29D 11/00442; B29D 11/00009; B29C 33/3842
See application file for complete search history.

(56) References Cited

U.S. PATENT DOCUMENTS

| 5,372,755 A | 12/1994 | Stoerr et al. |
| 6,099,764 A | 8/2000 | Su et al. |

(Continued)

FOREIGN PATENT DOCUMENTS

| CN | 101495297 A | 7/2009 |
| EP | 1 203 626 A1 | 5/2002 |

(Continued)

OTHER PUBLICATIONS

Sep. 12, 2017 International Search Report issued in International Patent Application No. PCT/JP2017/024208.

*Primary Examiner* — Mathieu D Vargot
(74) *Attorney, Agent, or Firm* — Oliff PLC (57) ABSTRACT

A lens-mold producing method includes a position and posture determining step of specifying positions and postures, in space coordinates, of a first mold having a molding surface for forming one optical surface of a lens and a second mold having a molding surface for forming the other optical surface, a mold holding step of rotating and/or inclining, based on the positions and postures in the space coordinates, at least one of the first and second mold, maintaining a rotation angle and/or an inclination angle of a reference plane of the first mold with respect to a reference plane of the second mold, and holding the first and second mold, and an assembling step of arranging the molding surfaces of the first and second mold so as to face each other, fixing outer peripheries of the first mold and the second mold, and assembling a lens mold.

13 Claims, 7 Drawing Sheets

(52) U.S. Cl.
CPC .. *B29D 11/00009* (2013.01); *B29D 11/00442* (2013.01); *B29K 2105/0002* (2013.01)

(56) References Cited

U.S. PATENT DOCUMENTS

| | | |
|---|---|---|
| 6,821,461 B1 | 11/2004 | Bessiere et al. |
| 7,488,170 B2 | 2/2009 | Yuasa et al. |
| 2003/0214061 A1 | 11/2003 | Hosoe |
| 2004/0244421 A1 | 12/2004 | Kato et al. |
| 2006/0024403 A1 | 2/2006 | Matsumoto et al. |
| 2007/0296096 A1 | 12/2007 | Bruce et al. |
| 2010/0201009 A1 | 8/2010 | Bruce et al. |
| 2012/0013030 A1* | 1/2012 | Kadowaki ........ B29D 11/00028 264/2.5 |
| 2013/0026668 A1 | 1/2013 | Lee et al. |

FOREIGN PATENT DOCUMENTS

| | | |
|---|---|---|
| EP | 2 031 432 A2 | 3/2009 |
| EP | 2 415 588 A1 | 2/2012 |
| JP | 2003-500257 A | 1/2003 |
| JP | 2003-526810 A | 9/2003 |
| JP | 2004-077632 A | 3/2004 |
| JP | 2008-040497 A | 2/2008 |
| JP | 2010-120165 A | 6/2010 |
| WO | 01/67139 A1 | 9/2001 |
| WO | 2008/078395 A1 | 7/2008 |
| WO | 2010/114023 A1 | 10/2010 |
| WO | 2011/105186 A1 | 9/2011 |

* cited by examiner

METHOD FOR MANUFACTURING LENS FORMING MOLD, METHOD FOR MANUFACTURING EYEGLASS LENS, AND EYEGLASS LENS

TECHNICAL FIELD

The present disclosure relates to a lens-mold producing method, a spectacle-lens producing method, and a spectacle lens.

BACKGROUND ART

In order to spectacle lenses, since it is required to design various types according to the use environments and purposes of spectacle wearers, and to have optical performance according to refractive anomalies or adjustment anomalies of individual wearers, a large number of design conditions (for example, distance portion power (spherical power, astigmatic power, and cylinder axes), addition power, prismatic power, optical design types, corridor lengths, amounts of inset, center thicknesses, edge thicknesses, outer diameters, and the like) are required. Thus, the number of combinations is extremely enormous. For this reason, it is extremely difficult to stock all kinds of finished lenses (lenses both optical surfaces of which are optically finished) in advance.

Generally, spectacle lenses such as progressive power spectacle lenses (hereinafter, referred to as "progressive lenses"), prism prescription lenses (hereinafter, referred to as "prism lenses"), and decentered lenses are produced by machining pre-produced lens blanks based on individual design conditions after a customer's order is received. For example, in the case of progressive lenses, semi-finished lens blanks each having an optically finished progressive surface formed on the front lens surface (convex surface), and an optically unfinished rear lens surface (concave surface) formed to be thick are stocked, and an optimum semi-finished lens is selected according to a customer's order. Then, the rear surface of the semi-finished lens is optically finished according to the customer's order by cutting and polishing with a cutting machine (curve generator) and a polishing machine, and a progressive lens having the desired optical performance is thereby produced.

Furthermore, in order to make progressive lenses thinner and lighter, prism thinning processing for cutting the rear surface of a semi-finished lens has been performed so as to add prisms having the perpendicular base direction equally to the left and right lenses.

As a method for producing semi-finished lens blanks, a cast polymerization method using a tape molding method, in which a lens is cast by holding two molds for molding the front and rear surfaces of a lens with a predetermined distance, winding adhesive tape around the peripheries to form a lens mold, injecting a plastic liquid monomer into the mold, and curing it, has been used (for example, Patent Literatures 1 and 2).

CITATION LIST

Patent Literature

Patent Literature 1: WO 2010/114023 A
Patent Literature 2: JP 2010-120165 A

SUMMARY OF INVENTION

Technical Problem

However, as described above, when spectacle lenses are produced on order by cutting and polishing lens blanks, it is required to form the unfinished surfaces of the lens blanks to be thick in order to handle various orders with a small number of lens blanks, and to stock a large number of produced lens blanks each having a large volume.

Furthermore, in the techniques proposed in Patent Literatures 1 and 2, jigs such as a holder and an inclination angle setting tool are required in order to hold two molds with a predetermined inclination angle.

An embodiment of the present disclosure provides a lens-mold producing method and a spectacle-lens producing method with which orders of various lenses can be handled with few kinds of lens blanks.

Solution to Problem

In order to solve the above problems, the inventors have found, as a result of intensive research, that the above problems are solved by rotating and/or inclining, based on the positions and postures of a first mold and a second mold which form a mold in the space coordinates, at least one of the first mold and the second mold.

That is, an embodiment of the present disclosure is the following [1] to [3].

[1] A lens-mold producing method including a position and posture determining step of specifying positions and postures, in space coordinates, of a first mold having a molding surface $R_1$ for forming one optical surface of a lens and a second mold having a molding surface $R_2$ for forming the other optical surface, a mold holding step of rotating and/or inclining, based on the positions and postures in the space coordinates, at least one of the first mold and the second mold, maintaining a rotation angle and/or an inclination angle of a reference plane of the first mold with respect to a reference plane of the second mold, and holding the first mold and the second mold, and an assembling step of arranging the molding surface $R_1$ of the first mold and the molding surface $R_2$ of the second mold so as to face each other, fixing outer peripheries of the first mold and the second mold, and assembling a lens mold.

[2] A spectacle-lens producing method including a filling step of filling a liquid monomer containing a monomer composition into a lens mold assembled by the method according to [1], and a curing step of polymerizing and curing the filled liquid monomer and casting a spectacle lens.

[3] A spectacle lens having an arithmetic average roughness Ra according to JIS B0601:2001 on a lens surface of 1.0 μm or less.

Advantageous Effects of Invention

According to the above embodiment, it is possible to provide a lens-mold producing method and a spectacle-lens producing method with which orders of various lenses can be handled.

DESCRIPTION OF EMBODIMENTS

Hereinafter, embodiments of the present disclosure are described in detail with reference to the drawings. In the drawings, the same or equivalent elements are denoted by the same reference signs, and its repeated description is omitted.

Lens-Mold Producing Method

First Embodiment

Figure 1:
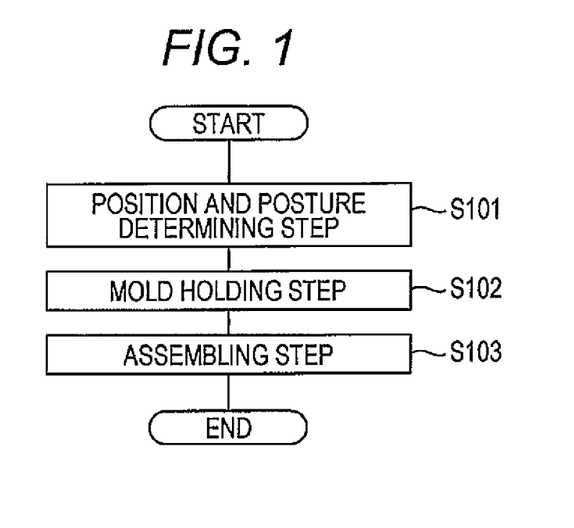
FIG. 1 is a flowchart of a lens-mold producing method according to an embodiment of the present disclosure.

FIG. 1 is a flowchart of a lens-mold producing method according to an embodiment of the present disclosure.

As shown in FIG. 1, the lens-mold producing method according to a first embodiment of the present disclosure includes a position and posture determining step S101, a mold holding step S102, and an assembling step S103.

Each step is described in detail below.

First, a first mold and a second mold used in each step are described.

Figure 2:
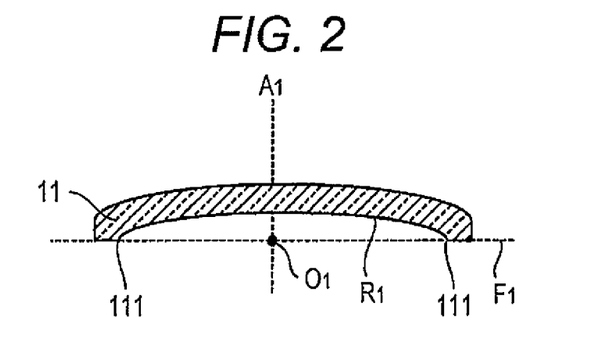
FIG. 2 is a schematic cross-sectional view of a first mold used in a lens-mold producing method according to an embodiment of the present disclosure.

FIG. 2 is a schematic cross-sectional view of the first mold used in a lens-mold producing method according to an embodiment of the present disclosure. As shown in FIG. 2, a first mold 11 has a concave molding surface $R_1$ on which one optical surface (convex surface) of a lens is transferred and formed. In order to specify the position and posture of the first mold 11 in the space coordinates, a reference plane $F_1$, a reference axis $A_1$, and a reference point $O_1$ of the first mold 11 are used as references. The reference plane $F_1$ of the first mold 11 is the plane including an outer periphery 111 of the molding surface $R_1$ in the first mold 11. The reference axis $A_1$ of the first mold 11 is the normal line of the reference plane $F_1$ of the first mold 11 and is the central axis passing through the geometric center of the molding surface $R_1$. The reference point $O_1$ of the first mold 11 is the point intersecting the reference axis $A_1$ on the reference plane $F_1$.

Figure 3:
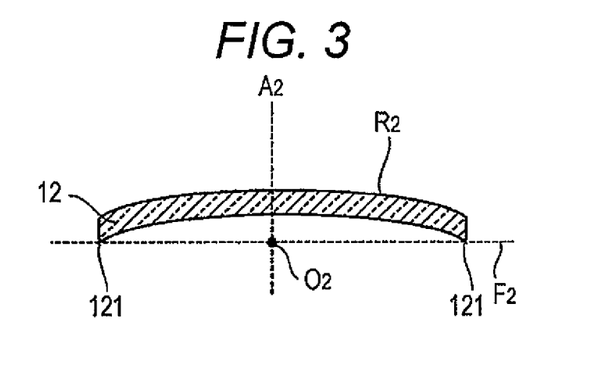
FIG. 3 is a schematic cross-sectional view of a second mold used in a lens-mold producing method according to an embodiment of the present disclosure.

FIG. 3 is a schematic cross-sectional view of a second mold used in a lens-mold producing method according to an embodiment of the present disclosure. As shown in FIG. 3, a second mold 12 has a convex molding surface $R_2$ on which the other optical surface (concave surface) of the lens is transferred and formed. In order to specify the position and posture of the second mold 12 in the space coordinates, a reference plane $F_2$, a reference axis $A_2$, and a reference point $O_2$ of the second mold 12 are used. The reference plane $F_2$ of the second mold 12 is the plane including an outer periphery 121 of the surface facing the molding surface $R_2$ in the second mold 12. The reference axis $A_2$ of the second mold 12 is the normal line of the reference plane $F_2$ of the second mold 12 and is the central axis passing through the geometric center of the molding surface $R_2$. The reference point $O_2$ of the second mold 12 is the point intersecting the reference axis $A_2$ on the reference plane $F_2$.

The first mold 11 and the second mold 12 are formed of a material such as glass, resin, or metal. The first mold 11 and the second mold 12 may be formed of the same material or a different material.

Figure 4:
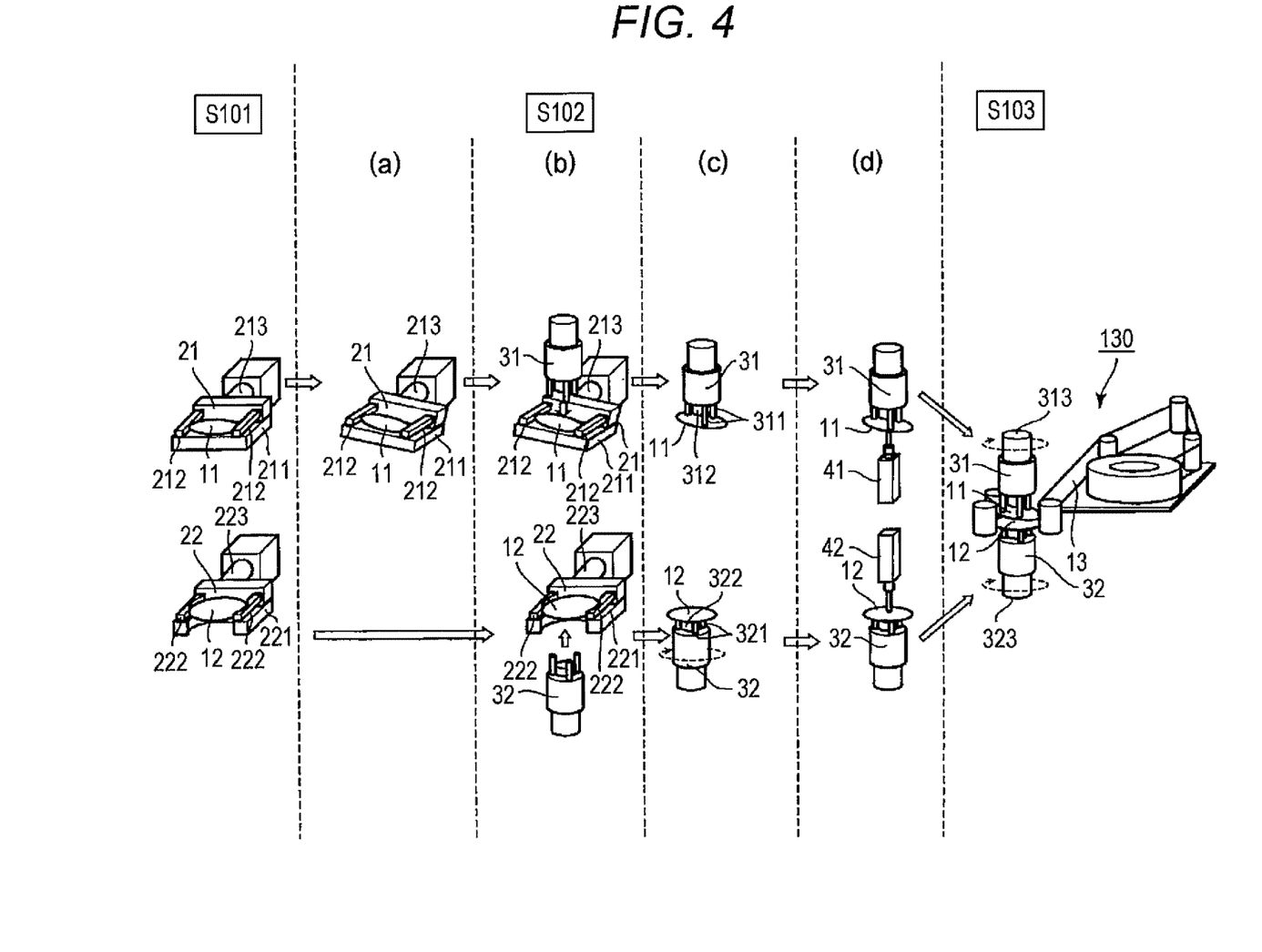
FIG. 4 is a schematic process chart of a lens-mold producing method according to a first embodiment of the present disclosure.

FIG. 4 is a schematic process chart of the lens-mold producing method according to the first embodiment of the present disclosure. The lens-mold producing method according to an embodiment of the present disclosure shown in FIG. 1 is described with reference to FIG. 4.

<Position and Posture Determining Step S101>

A position and posture determining step S101 includes specifying the positions and postures, in the space coordinates, of the first mold 11 having the molding surface $R_1$ for forming one optical surface of a lens and the second mold 12 having the molding surface $R_2$ for forming the other optical surface.

The position and posture determining step S101 as shown in the process chart of S101 in FIG. 4 is performed while the first mold 11 is being placed on a first jig 21 and the second mold 12 is being placed on a second jig 22.

The first jig 21 includes a placing portion 211, a gripping portion 212, and a shaft portion 213. The second jig 22 includes a placing portion 221, a gripping portion 222, and a shaft portion 223.

The placing portions 211 and 221 each have a shape and configuration capable of placing the first mold 11 and the second mold 12 respectively. By placing the first mold 11 and the second mold 12 thereon, the reference plane $F_1$ of the first mold 11 and the reference plane $F_2$ of the second mold 12 can be determined. It is desirable that the placing portions 211 and 221 are provided with respective rotating portions (not shown) that are rotatable about the reference axis $A_1$ and the reference axis $A_2$ in the peripheral direction while placing the first mold 11 and the second mold 12 thereon.

The gripping portions 212 and 222 are capable of gripping and fixing the outer peripheries of the first mold 11 and the second mold 12 respectively. Since the first jig 21 and the second jig 22 are provided with the gripping portions 212 and 222 respectively, it is possible to specify the positions of the outer peripheries of the first mold 11 and the second mold 12, and to fix the first mold 11 and the second mold 12 more stably. The gripping portions 212 and 222 are driven by respective drive portions (not shown) such as air cylinders provided to the first jig 21 and the second jig 22.

The shaft portions 213 and 223 are capable of independently inclining the first mold 11 and the second mold 12 which are fixed by the respective placing portions 211 and 221 and the respective gripping portions 212 and 222 with respect to a first mold holder 31 and a second mold holder 32 respectively.

Figure 5:
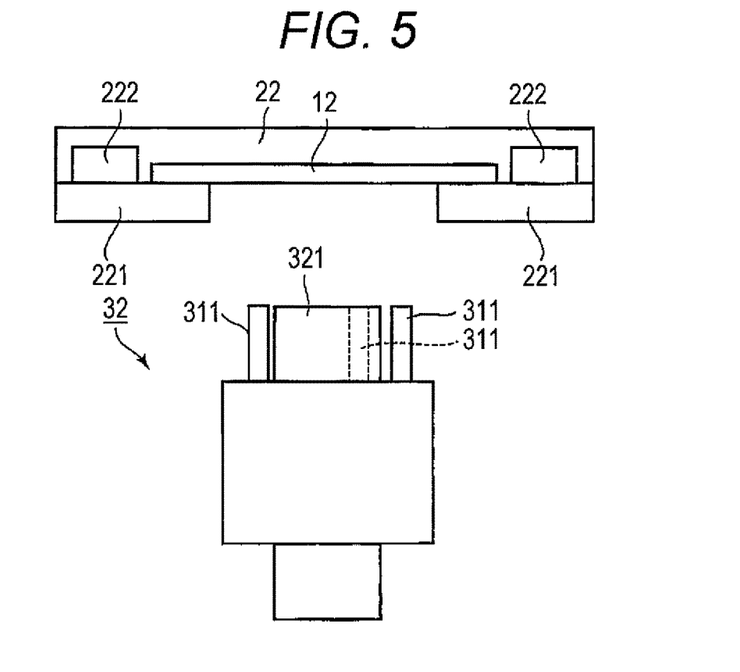
FIG. 5 is a schematic side view of a second jig and a second mold holder used in the lens-mold producing method according to the first embodiment of the present disclosure.
Figure 6:
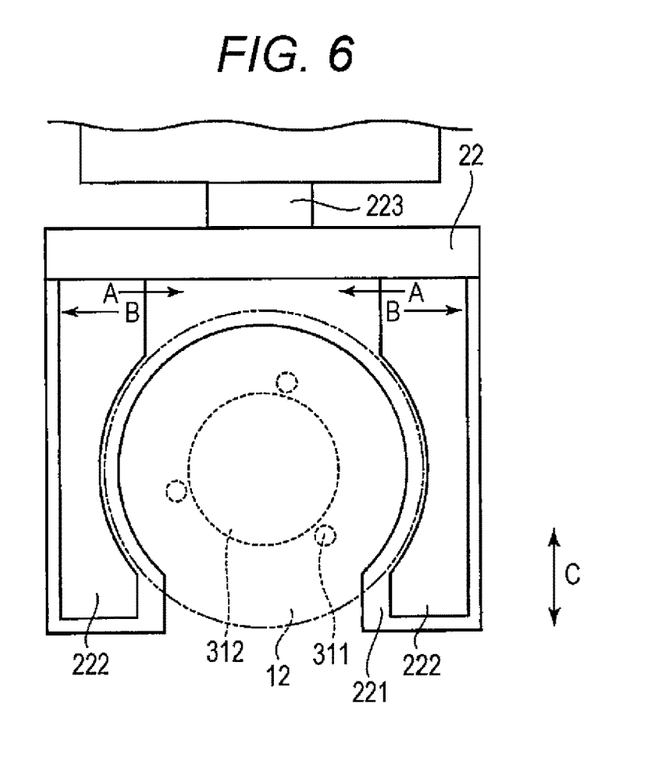
FIG. 6 is a schematic top view of the second jig and the second mold holder used in the lens-mold producing method according to the first embodiment of the present disclosure.

FIG. 5 is a schematic side view of the second jig 22 and the second mold holder 32 used in the lens-mold producing method according to the first embodiment of the present disclosure. FIG. 6 is a schematic top view of the second jig 22 and the second mold holder 32 used in the lens-mold producing method according to the first embodiment of the present disclosure. The second jig 22 including the placing portion 221 is described with reference to FIGS. 5 and 6. The placing portion 221 of the second jig 22 is not particularly limited as long as it has a shape on which the second mold 12 can be placed, and includes an opening portion to be described below.

The size of the opening portion of the placing portion 221 of the second jig 22 is larger than the second mold holder 32 when viewed from below the placing portion 221 so that the second mold 12 can be held from below by the second mold holder 32. The size of the opening portion is smaller than the diameter of the second mold 12 so that the second mold 12 is placed thereon. In addition, the opening portion of the placing portion 221 of the second jig 22 opens in the horizontal direction so that the second mold holder 32 holding the second mold 12 from below can move in the horizontal direction (the direction C of the arrow shown in FIG. 6) relatively with the second jig 22. That is, the placing portion 221 has, for example, a substantially U shape by having the opening portion.

The second jig 22 moves the gripping portion 222 in the direction A of the arrow shown in FIG. 6 with respect to the second mold 12 placed on the placing portion 221, and grips the second mold 12 with the gripping portion 222. The second mold holder 32 moves through the opening portion from below the placing portion 221 toward the second mold 12 to hold the second mold 12 from below. The second jig 22 moves the gripping portion 222 in the direction B of the arrow shown in FIG. 6 so as to be separated from the outer periphery portion of the second mold 12 held from below by the second mold holder 32 to release the second mold 12.

The second mold holder 32 moves through the opening portion in the horizontal direction while holding the second mold 12, and separates the second mold 12 from the second jig 22.

As specific operation, the respective outer diameters of the first mold 11 fixed by the first jig 21 and the second mold 12 fixed by the second jig 22 are measured, and the centering of each of the first mold 11 and the second mold 12 is performed. The centering results are determined as the positions based on the main parts of the first mold 11 and the second mold 12 in the space coordinates in which the reference point $O_1$ of the first mold 11 and the reference point $O_2$ of the second mold 12 are set as the origin. Here, it may have better that, on the molding surface $R_1$ and the molding surface $R_2$, the centering results are determined as the positions based on the space coordinates in which a prism measurement reference point of a progressive lens or a geometric center (geometric center of the spectacle lens) which is substantially at the same position as the optical center of a single focus lens is added.

Since the first mold 11 and the second mold 12 are placed on the placing portions 211 and 221 respectively, the reference planes $F_1$ and $F_2$ are determined, and the postures of the first mold 11 and the second mold 12 in the space coordinates are determined based on the reference planes $F_1$ and $F_2$.

<Mold Holding Step S102>

The mold holding step S102 includes rotating and/or inclining at least one of the first mold 11 and the second mold 12 based on the positions and postures in the space coordinates specified in the position and posture determining step S101, maintaining the rotation angle and/or the inclination angle of the reference plane $F_1$ of the first mold 11 with respect to the reference plane $F_2$ of the second mold 12, and holding the first mold 11 and the second mold 12.

The mold holding step S102 in the present embodiment includes, after rotating and/or inclining at least one of the first mold 11 and the second mold 12, maintaining the rotation angle and/or the inclination angle of the reference plane $F_1$ of the first mold 11 with respect to the reference plane $F_2$ of the second mold 12, and holding the first mold 11 and the second mold 12 by the first mold holder 31 and the second mold holder 32 respectively.

Here, "rotation" of the first mold 11 and the second mold 12 means a motion of rotating in the peripheral direction about the reference axis $A_1$ and the reference axis $A_2$ as the respective rotation axes. "Inclination" of the first mold 11 and the second mold 12 means a motion of inclining the reference plane $F_1$ and the reference plane $F_2$.

The first mold 11 and the second mold 12 are rotated by driving the respective rotating portions provided to the placing portions 211 and 221. By rotating the first mold 11 and the second mold 12, the rotation angle of the reference plane $F_1$ of the first mold 11 with respect to the reference plane $F_2$ of the second mold 12 is set to a specific angle.

The first mold 11 and the second mold 12 are inclined by driving the shaft portions 213 and 223 respectively. By inclining the first mold 11 and the second mold 12, the inclination angle of the reference plane $F_1$ of the first mold 11 with respect to the reference plane $F_2$ of the second mold 12 is set to a specific angle.

Figure 7:
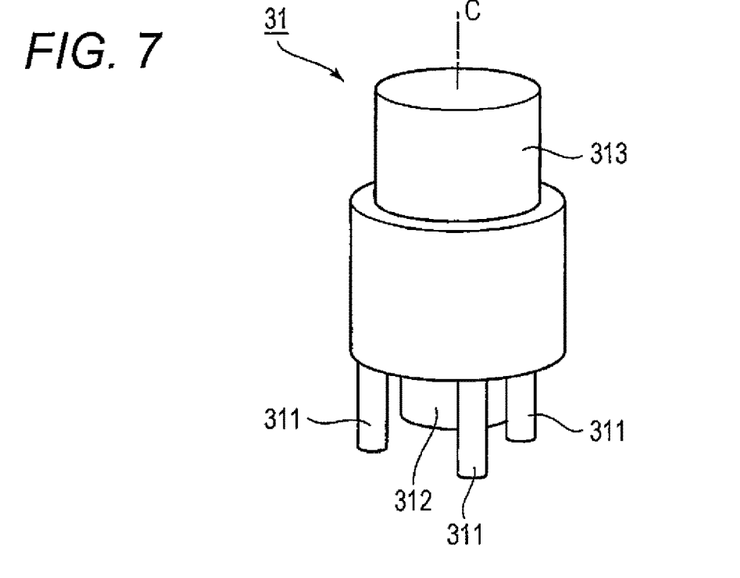
FIG. 7 is a schematic view of a first mold holder used in a lens-mold producing method according to an embodiment of the present disclosure.

FIG. 7 is a schematic view of a first mold holder used in a lens-mold producing method according to an embodiment of the present disclosure. With reference to FIG. 7, the first mold holder 31 and the second mold holder 32 used in the present embodiment are described. Since the first mold holder 31 and the second mold holder 32 have substantially the same structure and function, the first mold holder 31 is described with reference to FIG. 7 as a representative. The first mold holder 31 includes supports 311, a suction portion 312, and a shaft portion 313. The second mold holder 32 includes supports 321, a suction portion 322, and a shaft portion 323.

The number of the supports 311 is three or more, and one end of each support 311 comes into contact with the first mold 11, and the inclination of the first mold 11 can be controlled by driving each support 311. In addition, the supports 311 are capable of maintaining the inclination angle of the inclined first mold 11.

The suction portion 312 sucks the first mold 11. The suction portion 312 is connected to a vacuum generation device (not shown) such as a vacuum pump and an ejector, and is capable of holding the first mold 11 by sucking the first mold 11 in a state of being in close contact and by making the inside of the suction portion 312 negative pressure. The suction portion 312 is capable of maintaining the rotation angle of the first mold 11 by holding the first mold 11.

The shaft portion 313 is capable of rotating the first mold holder 31 about the axis C as the rotation center while the rotation angle and/or the inclination angle of the first mold 11 are maintained by the supports 311 and the suction portion 312. The axis C is irrelevant to the reference axis $A_1$ and the reference axis $A_2$.

First in the mold holding step S102 as shown in the process chart of S102(a) in FIG. 4, the first mold 11 is inclined, using the first jig 21, according to the information about the position and posture of the first mold 11 in the space coordinates specified in the step S101.

The process chart in FIG. 4 shows, as an example, that only the first mold 11 is inclined, but both of the first mold 11 and the second mold 12, or only the second mold 12 may be inclined. In addition, the first mold 11 may be further rotated, both of the first mold 11 and the second mold 12, or only the second mold 12 may be rotated.

Next, as shown in the process chart of S102(b) in FIG. 4, the first mold holder 31 and the second mold holder 32 are brought closer to the first mold 11 and the second mold 12 held by the first jig 21 and/or the second jig 22 respectively.

Then, as shown in the process chart of S102(c) in FIG. 4, the rotation angle and/or the inclination angle of the reference plane $F_1$ of the first mold 11 with respect to the reference plane $F_2$ of the second mold 12 is maintained, and the first mold 11 and the second mold 12 are held by the first mold holder 31 and the second mold holder 32 respectively. After the holding, the rotation angle of the second mold may be adjusted by rotating the mold holder 32. Note that, the rotation angle and/or the inclination angle of the reference plane $F_1$ of the first mold 11 with respect to the reference plane $F_2$ of the second mold 12 is maintained until the assembly of a lens-mold is completed.

Then, it may have better to further perform a position determining step of specifying the positions of the first mold 11 and the second mold 12 in the space coordinates after the mold holding step S102.

The position determining step as shown in the process chart of S102(d) in FIG. 4, the dimensions of the first mold 11 and the second mold 12, which are held by the first mold holder 31 and the second mold holder 32 respectively, necessary for assembling the lens mold are measured by measurement devices 41 and 42 respectively. The dimensions of the first mold 11 and the second mold 12 necessary for assembling the lens mold are, for example, the distance from the reference point $O_1$ to the molding surface $R_1$ in the reference axis $A_1$, the distance from the reference point $O_2$ to the molding surface $R_2$ in the reference axis $A_2$, the distance from the suction portion 312 of the first mold holder 31 to the molding surface $R_1$ in the reference axis $A_1$, the distance from the suction portion 322 of the second mold holder 32 to the molding surface $R_2$ in the reference axis $A_2$, and the like. The measurement devices 41 and 42 are, for example, a micro gauge, a dial gauge, and the like as a contact type measurement device, and a laser displacement meter, a pressure gauge, and the like as a non-contact type measurement device.

In the position determining step, by referring to the information about the measured dimensions of the first mold 11 and the second mold 12, and adjusting the information about the positions and postures in the space coordinates specified in the position and posture determining step S101, the final positions of the first mold 11 and the second mold 12 in the space coordinates for assembling the lens mold are determined.

<Assembling Step S103>

The assembling step S103 includes arranging the molding surface $R_1$ of the first mold 11 and the molding surface $R_2$ of the second mold 12 so as to face each other, fixing the outer peripheries of the first mold 11 and the second mold 12, and assembling the lens mold.

As specific operation as shown in the process chart of S103 in FIG. 4, the rotation angle and/or the inclination angle of the reference plane $F_1$ of the first mold 11 with respect to the reference plane $F_2$ of the second mold 12 is maintained, the first mold 11 and the second mold 12 are arranged so as to face each other with a predetermined distance based on the lens design conditions (for example, the center thickness of the lens and the edge thickness). Then, while the relative rotation angles, inclination angles, and positions of the first mold 11 and the second mold 12 are maintained, and adhesive tape 13 is wound and stuck by an adhesive-tape winding device 130 around the outer peripheral surfaces of the first mold 11 and of the second mold 12 so that its adhesive layer side faces inward and the outer peripheral surfaces are wound by one turn and a little more. The positional relationship between the first mold 11 and the second mold 12 is fixed by the adhesive tape 13.

Figure 8:
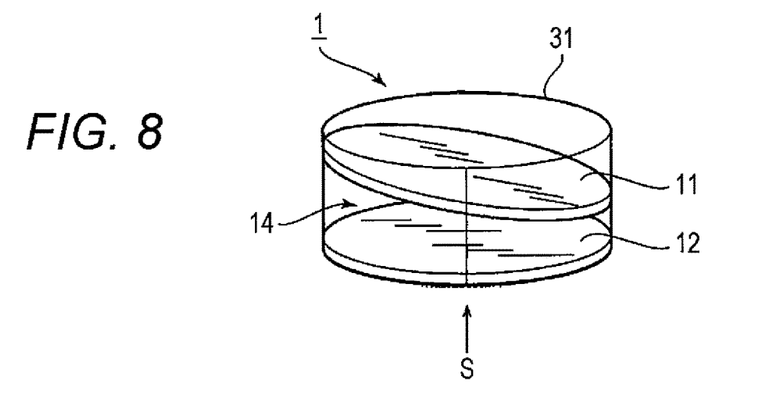
FIG. 8 is a schematic view of a lens mold, in which only a first mold is inclined, produced by a lens-mold producing method according to an embodiment of the present disclosure.

FIG. 8 is a schematic view of a lens mold, in which only a first mold is inclined, produced by a lens-mold producing method according to an embodiment of the present disclosure. As shown in FIG. 8, the lens mold 1 fixed by the adhesive tape 13 has a gap 14 between the first mold 11 and the second mold 12, and the lens mold 1 blocked by being surrounded by the molding surface $R_1$ of the first mold 11, the molding surface $R_2$ of the second mold 12, and the inner surface of the adhesive tape 13 is formed. The adhesive tape 13 is wound and stuck by one turn and a little more from a winding start position S. By fixing the outer peripheries with the adhesive tape, it is possible to form a lens mold inexpensively and simply while the positions and postures of the first mold 11 and the second mold 12 are maintained.

Figure 9:
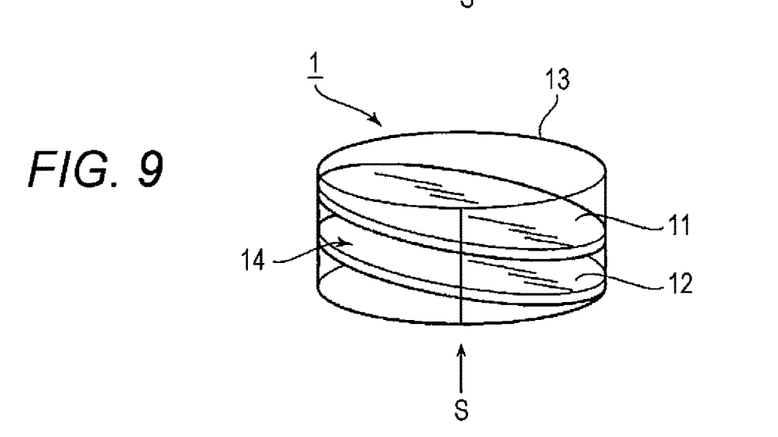
FIG. 9 is a schematic view of a lens mold 1, in which a first mold and a second mold are inclined, produced by a lens-mold producing method according to an embodiment of the present disclosure.

FIG. 9 is a schematic view of a lens mold 1, in which a first mold and a second mold are inclined, produced by a lens-mold producing method according to an embodiment of the present disclosure. The lens mold 1 shown in FIG. 9, in which the first mold 11 and the second mold 12 are inclined, has the effect that the effective diameter of an obtained lens can be increased.

The adhesive tape 13 is a band-shaped resin film made of a film as a base material and adhesive, and an adhesive layer is formed on one surface.

The base material is not particularly limited, and polyethylene, polyolefin such as polypropylene, polyester such as polyethylene terephthalate, polybutylene terephthalate, or polyethylene naphthalate is used by being processed into a film shape.

As the adhesive, for example, acrylic-based adhesive, silicone-based adhesive, or the like may be used. It may have better that the adhesive has resistance to a liquid monomer so as to dissolve in the liquid monomer when the liquid monomer injected into the lens mold and to prevent optical defects from occurring in the lens at the time of heat curing.

Note that, the base material may be provided with an intermediate layer to improve the adhesion between the base material and the adhesive.

It may have better that the winding start position S of the adhesive tape 13 fixing the outer peripheries of the first mold 11 and the second mold 12 is arbitrarily set in the assembling step S103. When the liquid monomer is injected, the liquid monomer is injected from the vicinity of the winding start position S of the adhesive tape 13, and, even after the first mold 11 and/or the second mold 12 are inclined, the position having the width with which the liquid monomer can be injected is set as the winding start position S of the adhesive tape 13.

The process chart in FIG. 4 shows, as an example, that the outer peripheries of the first mold 11 and of the second mold 12 are fixed by the adhesive tape 13 in the assembling step S103, but the outer peripheries of the first mold 11 and of the second mold 12 may be fixed by a reusable gasket instead of the adhesive tape 13.

The gasket is made of elastic resin. As the material of the gasket, for example, thermoplastic polyurethane elastomer or the like can be used. Thermoplastic polyurethane elastomer is composed of soft segment and hard segment. The soft segment is composed of, for example, polymeric glycol, and the hard segment is composed of, for example, a monomolecular chain extender and di-isocyanate. The types and amounts of polymeric glycol, monomolecular chain extender, and di-isocyanate can be appropriately changed depending on the shape of the gasket and the molding material of a lens to be casted. As the material of the gasket, materials other than those having moderate elasticity can be used, and materials such as ultra-low density polyethylene and polyolefin elastomer can be also used.

<Selective Step>

In the lens-mold producing method according to the first embodiment, it may have better, when the molding surface $R_1$ is a progressive surface, to specify the progressive surface in the position and posture determining step.

In the case of producing the lens mold 1 for a progressive lens, the molding surface $R_1$ of the first mold 11 is a progressive surface. Since it is necessary to specify the progressive surface when the positions and postures of the first mold 11 and the second mold 12 in the space coordinates are specified, it may have better to specify the progressive surface in the position and posture determining step S101.

In the case of producing a lens mold having a progressive surface, with the lens-mold producing method according to the first embodiment, it is unnecessary to manage many types of jigs, and the management of jigs is not complicated.

In the lens-mold producing method according to the first embodiment, it may have better to perform the axial alignment of the first mold 11 and the second mold 12 in the position and posture determining step S101 or the mold holding step S102. The axial alignment means detecting an axis that can be a reference of the position and posture of a mold. The axis includes an optical axis, a geometrical center axis, and an axis related to a prism base direction, a progressive direction, or a cylinder axis direction.

As the axial alignment of the first mold 11, in the case of producing a prism lens, the axial alignment in the prism base direction is performed. Alternatively, as the axial alignment of the first mold 11, when the molding surface $R_1$ of the first mold 11 is a progressive surface, the axial alignment in the progressive direction is performed.

As the axial alignment of the second mold 12, in the case of producing an astigmatic prescription lens, the axial alignment in the cylinder axis direction is performed.

The axial alignment of the first mold 11 and the second mold 12 is performed by, for example, processing an image detected by reflection detection of light such as a laser, step detection of scribe lines, optical characteristic detection by an auto mens meter, or the like.

With the lens-mold producing method according to the first embodiment, since it is possible to rotate and/or incline at least one of the first mold 11 and the second mold 12, maintain the rotation angle and/or the inclination angle of the reference plane $F_1$ of the first mold 11 with respect to the reference plane $F_2$ of the second mold 12, and hold the first mold 11 and the second mold 12, it is possible to produce lens molds corresponding to various lens orders.

Furthermore, the lens-mold producing method according to the first embodiment, since it is possible to produce a lens mold according to an order by specifying the positions and postures of the first mold 11 having the molding surface $R_1$ and the second mold 12 having the molding surface $R_2$ in the space coordinates, it is unnecessary to form the non-finished surfaces of lens blanks to be thick, and it is possible to improve the utilization rate of the liquid monomer.

Second Embodiment

A lens-mold producing method according to a second embodiment of the present disclosure is different from the lens-mold producing method according to the first embodiment in a mold holding step S102. Since the others are substantially the same, the description is omitted.

Figure 10:
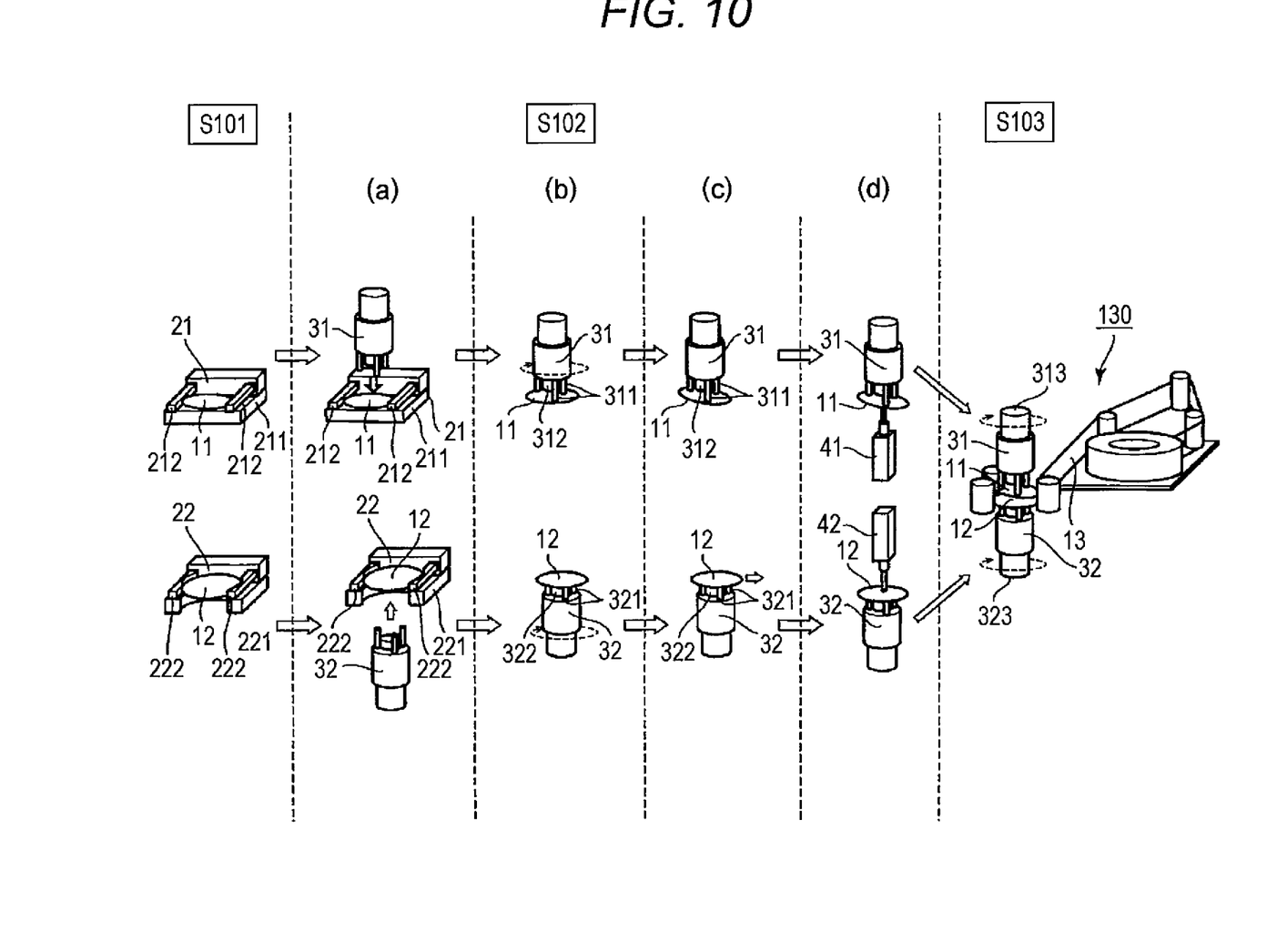
FIG. 10 is a schematic process chart of a lens-mold producing method according to a second embodiment of the present disclosure.

FIG. 10 is a schematic process chart of the lens-mold producing method according to the second embodiment of the present disclosure. The lens-mold producing method according to the embodiment of the present disclosure is described with reference to FIG. 10.

<Mold Holding Step S102>

The mold holding step S102 includes, after holding a first mold 11 and a second mold 12 by a first mold holder 31 and a second mold holder 32 respectively, rotating and/or inclining at least one of the first mold 11 and the second mold 12 based on the positions and postures in the space coordinates specified in a position and posture determining step S101, and maintaining and holding the rotation angle and/or the inclination angle of a reference plane $F_1$ of the first mold 11 with respect to a reference plane $F_2$ of the second mold 12.

First in mold holding step S102 as shown in the process chart of S102(a) in FIG. 10, the first mold 11 and the second mold 12 being held by a first jig 21 and a second jig 22 are held by the first mold holder 31 and the second mold holder 32 respectively. At this time, the first jig 21 and the second jig 22 are not rotated and/or inclined.

Next, as shown in the process chart of S102(b) in FIG. 10, the first mold 11 and the second mold 12 are separated from the first jig 21 and the second jig 22 holding the dies in S102(a) in FIG. 10.

Next, as shown in the process chart of S102(b) and (c) in FIG. 10, the first mold 11 is rotated and/or inclined according to the specified positions and postures of the first mold 11 and the second mold 12 in the space coordinates, and the rotation angle and/or the inclination angle of the reference plane $F_1$ of the first mold 11 with respect to the reference plane $F_2$ of the second mold 12 are maintained and hold by the first mold holder 31 and the second mold holder 32. Note that, the rotation angle and/or the inclination angle of the reference plane $F_1$ of the first mold 11 with respect to the reference plane $F_2$ of the second mold 12 is maintained until the assembly of a lens mold is completed.

The process chart in FIG. 10 shows, as an example, that only the first mold 11 is inclined, but both of the first mold 11 and the second mold 12, or only the second mold 12 may be inclined. The process chart in FIG. 10 shows, as an example, that both of the first mold 11 and the second mold 12 are rotated, but either of the first mold 11 and the second mold 12 may be rotated.

The first mold 11 and the second mold 12 are inclined by driving respective supports 312 and 322 of the first mold holder 31 and the second mold holder 32 to set the first mold 11 and the second mold 12 at respective desired inclination angles.

Then, it may have better to further perform a position determining step of specifying the positions of the first mold 11 and the second mold 12 in the space coordinates after the mold holding step S102. Since the position determining step is substantially similar to that in the first embodiment, the description is omitted.

With the lens-mold producing method according to the second embodiment of the present disclosure, it is possible to obtain a similar effect to the lens-mold producing method according to the first embodiment.

Furthermore, with the lens-mold producing method according to the second embodiment of the present disclosure, since it is unnecessary for the first jig 21 and the second jig 22 to rotate and/or incline the first mold 11 and the second mold 12, respective rotating portions and shaft portions 213 and 223 for rotating and/or inclining the first jig 21 and the second jig 22 are unnecessary, and it is possible to simplify the first jig 21 and the second jig 22.

[Lens-Mold Forming System]

Figure 11:
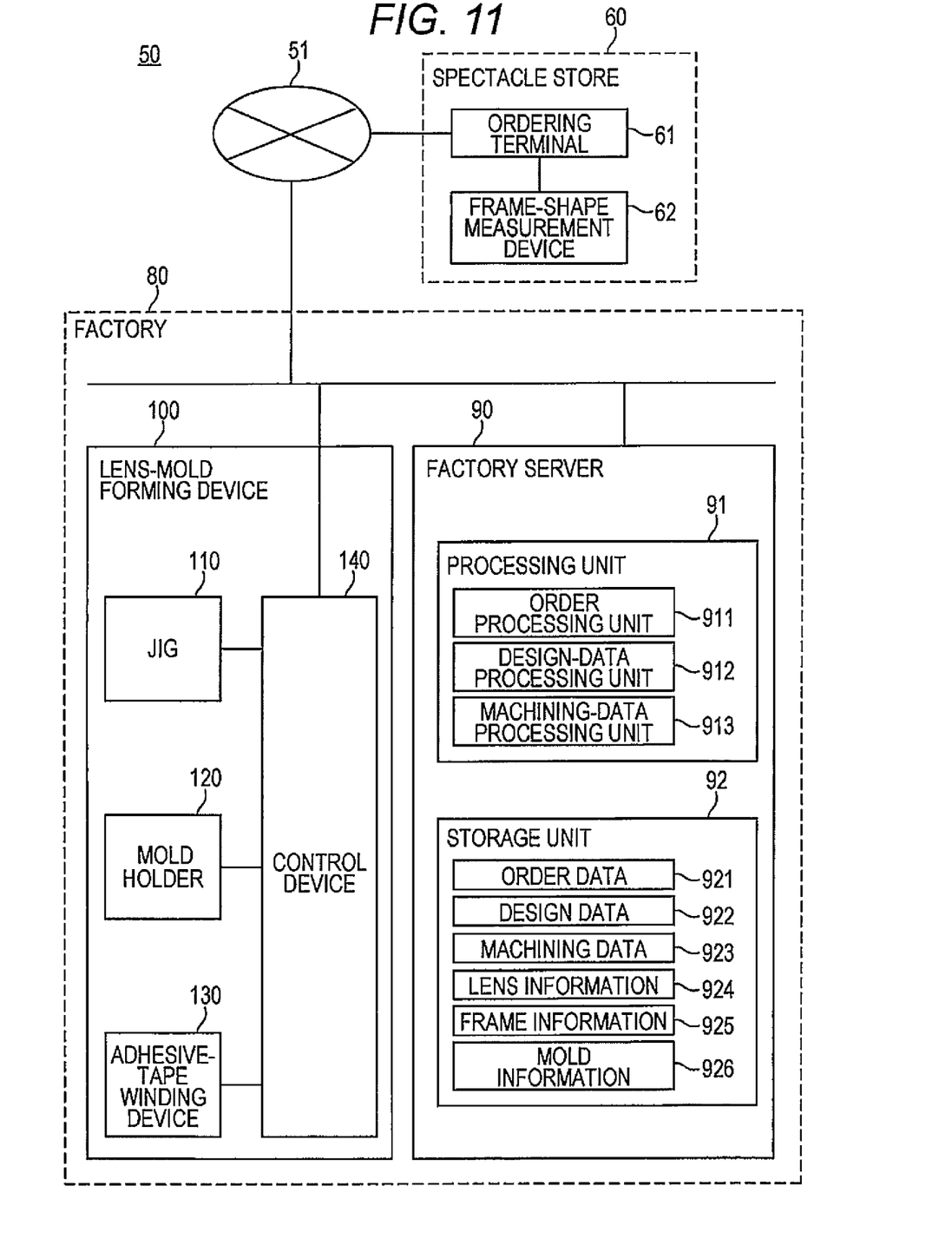
FIG. 11 is a configuration diagram of a lens-mold forming system including a lens-mold forming device.

FIG. 11 is a configuration diagram of a lens-mold forming system including a lens-mold forming device. As shown in FIG. 11, a lens-mold forming system 50 according to an embodiment of the present disclosure constitutes a part of a spectacle lens supplying system for producing a spectacle lens according to an order placed online from an order source. A spectacle store 60 is shown as an example of an ordering source and a factory 80 of a lens maker is shown as an example of a lens manufacturer. The spectacle store 60 and the factory 80 are connected via a communication medium 51. As the communication medium 51, for example, the Internet, a public communication line, a dedicated line, or the like can be used, and a relay station may be provided between the two.

In the following description, the ordering source is the spectacle store 60, but is not limited thereto, and may be, for example, an ophthalmology clinic, an individual, a sales office of a lens maker, or the like. In addition, the order source is not limited to one, and a large number of order sources can be connected to the lens manufacturer via the communication medium 51.

In the spectacle store 60, an ordering terminal 61 and a frame-shape measurement device 62 that measures the shape of a spectacle frame (the lens outer peripheral shape serving as the rim-frame inner peripheral shapes and lens shapes) are installed. The ordering terminal 61 includes communication means for connecting to the factory 80 via the communication medium 51, and is capable of transmitting and receiving information necessary for ordering lenses.

In the factory 80, a factory server 90 which is a computer that receives an order from the ordering terminal 61, generates data necessary for producing a lens based on the order, and stores the data, and a lens-mold forming device 100 that forms a lens mold based on the order, the generated data, and the like are installed.

The factory server 90 includes a processing unit 91 and a storage unit 92. When receiving a lens order from the spectacle store 60, the factory server 90 generates order data 921 and design data 922 with an order processing unit 911 and a design-data processing unit 912 respectively.

The processing unit 91 includes an order processing unit 911 that receives an order from the ordering terminal 61 and stores it as order data 921, a design-data processing unit 912 that calculates the shape of the spectacle lens based on the order data 921 and stores it as design data 922, and a machining-data generating unit 913 that generates, based on the order data 921 and the design data 922, control data and machining conditions of devices in various producing processes, and stores them as machining data 923.

In addition to the order data 921, the design data 922, and the machining data 923, the storage unit 92 stores lens information 924, frame information 925, mold information 926 as the information about the first and second molds, and the like which are necessary for processing in the processing unit 91.

The design-data processing unit 912 has a function for calculating the lens shape of an uncut lens and the lens shape of an edged lens assumed on the lens. The design-data processing unit 912 has a function, when the ordered lens is a progressive lens, for designing the lens shape subjected to uncut prism thinning and designing the lens shape subjected to edged prism thinning. Then, shape information about the front and rear surfaces of each lens, information about the arrangement of the front and rear surfaces, information about the edged shape assumed on the lens, position information about the prism reference point, the prismatic power, and the like are stored in the design data 922. When no prescription prism is designated in the order data, the prismatic power is to be the uncut prism thinning and its base direction (perpendicular) thereof, and the edged prism thinning and its base direction (perpendicular).

A machining-data processing unit 913 has a function, when the ordered lens is a progressive lens, for calculating the inclination angle of the reference plane of the first mold with respect to the reference plane of the second mold based on the prismatic power of the lens subjected to uncut prism thinning (uncut prism thinning in the case of having no prescription prism) stored in the design data 922, and the prismatic power of the lens subjected to edged prism thinning (edged prism thinning in the case of having no prescription prism). In addition, the first mold 11 and the second mold 12 to be used are selected based on the design data 922 including the calculated inclination angle and the mold information 926. Furthermore, when a prescription prism is designated, the rotation angle of the reference plane $F_1$ of the first mold with respect to the reference plane $F_2$ of the second mold is also determined. In addition, mold holding distances which are the holding distances of the first mold 11 and the second mold 12 are calculated. The calculated inclination angle, rotation angle, mold holding distances, the tools to be used (the first mold 11 and the second mold 12), and the like are stored in the machining data 923.

Here, the order data 921 includes, for example, spectacle lens information, spectacle frame information, prescription values, and layout information. The lens information 924 includes lens materials, refractive indexes, optical design types of front and rear surfaces of lenses, lens outer diameters, lens center thicknesses, edge thicknesses, decentering, base curves, corridor lengths, amounts of inset, Vee machining types, dye colors, coating types, and prism thinning types (uncut prism thinning and edged prism thinning). The frame information 925 includes, for example, product identification names, frame sizes, materials, frame curves, edged shapes, and frame shapes and lens shapes measured by a frame tracer. The prescription values includes, for example, the spherical power, the astigmatic power, the cylinder axis, the prescription prism, and the addition power. The layout information includes, for example, pupillary distances, near pupillary distances, and eye point positions.

The lens-mold forming device 100 includes a jig 110, a mold holder 120, an adhesive-tape winding device 130, and a control device 140 which is a computer that controls them.

The jig 110 includes the above first jig 21 and second jig 22. The mold holder 120 includes the above first mold holder 31 and second mold holder 32.

The tape winding device 130 includes, although not shown, a tape holding portion that holds a roll of adhesive tape so as to be rotatable about the axis parallel to the rotation axis of the lens mold, a tape sticking mechanism portion that pulls out the adhesive tape from the roll of adhesive tape and sticks the adhesive surface at the pulled-out end to the outer peripheries of the first mold 11 and the second mold 12, and a tape cutting mechanism portion that cuts the tape after winding the adhesive tape.

The control device 140 is connected to the factory server 90 via a network, and is capable of receiving the order data 921, the design data 922, the machining data 923, and the like stored in the storage unit 92 of the factory server 90. The control device 140 includes a control unit that controls rotation driving means and movement driving means of the jig 110, support driving means of the mold holder 120, suction-portion driving means, shaft-portion driving means, tape-sticking-mechanism-portion driving means and tape-cutting-mechanism-portion driving means of the adhesive-tape winding device 130, and the like. As the control device 140, a computer, a programmable controller, a combination thereof, or the like can be used.

[Spectacle-Lens Producing Method]

Figure 12:
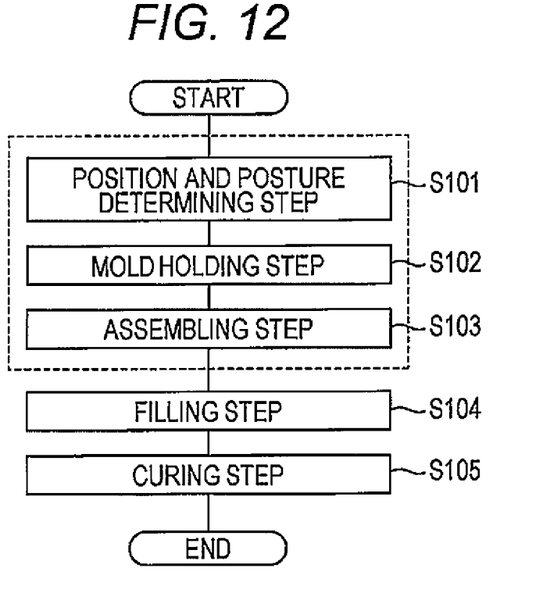
FIG. 12 is a flowchart of a spectacle-lens producing method according to an embodiment of the present disclosure.

FIG. 12 is a flowchart of a spectacle-lens producing method according to an embodiment of the present disclosure. As shown in FIG. 12, the spectacle-lens producing method according to the embodiment of the present disclosure includes a filling step S104 of filling a liquid monomer containing a monomer composition into a lens mold assembled by the lens-mold producing method including the above position and posture determining step S101, mold holding step S102, an assembling step S103, and a curing step S105 of polymerizing and curing the filled liquid monomer, and casting a lens.

Since the lens-mold producing method from S101 to S103 has been described above, the description here is omitted.

The lens mold 1, which is assembled by the steps from S101 to S103, for a spectacle lens is subjected to the filling step S104.

<Filling Step S104>

In the filling step S104, by partly peeled off adhesive tape 13 stuck on the lens mold 1 assembled in the assembling step S103, an injection port connecting a gap 14 and the outside is formed. Then, raw material liquid of the plastic lens is injected into the gap 14 from the injection port. The injection is stopped when the liquid monomer fills the gap 14 and reaches the injection port, and the adhesive tape 13 is stuck again on the injection port.

The monomer composition constituting the liquid monomer used in the present disclosure is not particularly limited, and the monomer composition includes, for example, a composition containing polythiourethane resin. Polythiourethane resin includes a combination of a polyisocyanate compound and a polythiol compound, or an epithio group-containing compound such as bis(β-epithiopropyl) sulfide and bis(β-epithiopropyl) disulfide. The polyisocyanate compound includes 1,3-diisocyanatomethyl-cyclohexane and xylene diisocyanate. The polythiol compound includes pentaerythritol tetrakis-(2-mercaptoacetate), 2,5-dimercaptomethyl-1,4-dithiane, mercaptomethyl-dithia-octanedithiol, and bis(mercaptomethyl)-trithiaundecane-dithiol.

To the monomer composition used in the present disclosure, known additives normally used for producing plastic lenses can be added as long as the effect of the present disclosure is not impaired.

The additives include, for example, ultraviolet absorbers for improving light absorption characteristic, color materials such as coloring matters and pigments, antioxidants and coloring inhibitors for improving weather resistance, and die lubricant for improving molding processability.

The ultraviolet absorbers include, for example, benzotriazole-based, benzophenone-based, and salicylic-acid-based ultraviolet absorbers.

The coloring materials include, for example, anthraquinone-based and azo-based coloring materials.

The antioxidants or coloring inhibitors include, for example, monophenol-based, bisphenol-based, polymer-type phenol-based, sulfur-based, and phosphorus-based antioxidants or coloring inhibitors.

The die lubricant includes, for example, fluorine surfactant, silicone-based surfactant, acid phosphate ester, and higher fatty acid.

<Curing Step S105>

Next, in the curing step S105, the lens mold 1 filled with the monomer composition is charged into a polymerization reactor and heated to a predetermined temperature to polymerize the raw material monomer.

After completion of the polymerization, the lens mold 1 is taken out from the polymerization reactor and cooled to room temperature, and then the adhesive tape 13, the first mold 11 and the second mold 12 are removed to take out the casted prism lens.

As described above, by forming the lens mold 1 and casting a lens by a cast polymerization method using the lens mold 1, it is possible to produce a spectacle lens as an uncut lens (finished lens before edging) subjected to various prescriptions. It is also possible to produce a progressive power lenses as an uncut lens having a progressive surface on the front surface of the lens.

The spectacle lens produced in this manner is subjected to various surface treatments (coating) on the front and back surfaces of the lens according to an order, edged into a desired lens shape, and mounted in the spectacle frame to be spectacles.

[Spectacle Lens]

Figure 13:
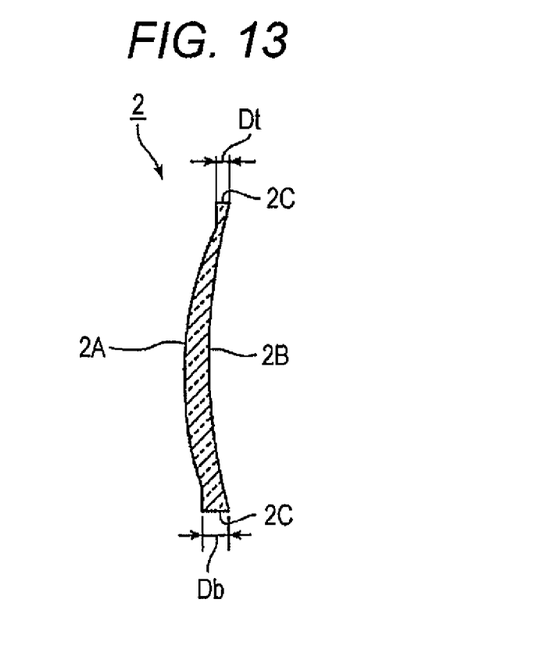
FIG. 13 is a schematic cross-sectional view of a spectacle lens (prism lens) which is an example of a spectacle lens according to an embodiment of the present disclosure.

FIG. 13 is a schematic cross-sectional view of a spectacle lens (prism lens) which is an example of a spectacle lens according to an embodiment of the present disclosure. As shown in FIG. 13, a spectacle lens 2 produced by the spectacle-lens producing method is a lens in which the edge thickness $D_t$ at one end and the edge thickness $D_b$ at the other end are different. In the example of the spectacle lens 2 shown in FIG. 13, the edge thickness $D_t$ at the one end is thinner than the edge thickness $D_b$ at the other end.

The spectacle lens 2 has a lens convex surface 2A and a lens concave surface 2B, and an edge surface 2C is formed around the lens convex surface 2A and the lens concave surface 2B. The lens convex surface 2A may be a progressive surface. The lens concave surface 2B can be a spherical surface, an aspherical surface, a progressive surface, a toroidal surface, or an atoroidal lens.

With the cast polymerization method using the lens mold 1, it is possible to cast the spectacle lens 2 having the lens convex surface 2A and the lens concave surface 2B smoother than a lens formed by cutting.

The arithmetic average roughness Ra, according to JIS B0601:2001, of the lens convex surface 2A and lens concave surface 2B of the spectacle lens 2 may be 1.0 μm or less, may be 0.9 μm or less, and may be 0.8 μm or less. By setting the arithmetic average roughness Ra of the lens convex surface 2A and the lens concave surface 2B of the spectacle lens 2 in the above range, it is possible to reduce scattering on the lens surface and to improve the lens transparency.

The material of the spectacle lens 2 is required to be a visible light transmissive material, and the refractive index may be 1.50 or more and 2.00 or less, may be 1.52 or more and 1.90 or less, and may be 1.54 or more and 1.80 or less. The material the refractive index of which falls the above range includes, for example, acrylic resin, thiourethane resin, and thioepoxy resin.

Finally, the first and second embodiments of the present disclosure are summarized with reference to the drawings and the like. As shown in FIGS. 1 to 6, a lens-mold producing method according to the first embodiment includes a position and posture determining step S101 of specifying positions and postures, in space coordinates, of a first mold 11 having a molding surface $R_1$ for forming one optical surface of a lens and a second mold 12 having a molding surface $R_2$ for forming the other optical surface, a mold holding step S102 of rotating and/or inclining, based on the positions and postures in the space coordinates, at least one of the first mold 11 and the second mold 12, maintaining a rotation angle and/or inclination angle of a reference plane $F_1$ of the first mold 11 with respect to a reference plane $F_2$ of the second mold 12, and holding the first mold 11 and the second mold 12, and an assembling step S103 of arranging the molding surface $R_1$ of the first mold 11 and the molding surface $R_2$ of the second mold 12 so as to face each other, fixing outer peripheries of the first mold 11 and the second mold 12, and assembling a lens mold 1.

As shown in FIG. 4, the mold holding step S102 in the lens-mold producing method according to the first embodiment includes, after rotating and/or inclining at least one of the first mold 11 and the second mold 12, maintaining the rotation angle and/or the inclination angle of the reference plane $F_1$ of the first mold 11 with respect to the reference plane $F_2$ of the second mold 12, and holding the first mold 11 and the second mold 12 by a first mold holder 31 and a second mold holder 32 respectively.

As shown in FIG. 10, a mold holding step S102 in a lens-mold producing method according to the second embodiment includes, after holding a first mold 11 and a second mold 12 by a first mold holder 31 and a second mold holder 32 respectively, rotating and/or inclining at least one of the first mold 11 and the second mold 12, and maintaining and holding the rotation angle and/or the inclination angle of a reference plane $F_1$ of the first mold 11 with respect to a reference plane $F_2$ of the second mold 12.

Furthermore, the lens-mold forming system 50 is summarized with reference to FIG. 11. The lens-mold forming system 50 includes, for example, the following embodiment [1] or [2].

[1] A lens-mold forming system 50 includes a factory server 90 that receives an order from an ordering terminal 61, generates data necessary for producing a lens based on the order, and stores the data, and a lens-mold forming device 100 that forms a lens mold based on the order, the generated data, and the like.

[2] A lens-mold forming system 50 includes a server 90 and a lens-mold forming device 100, in which the server (90) includes a processing unit 911 that receives an order from an ordering terminal 61, a processing unit that generates data necessary for producing a lens based on the order (the design-data processing unit 912 and the design-data processing unit 912 in FIG. 11), and a storage unit 92 that stores mold information 926, and the lens type forming device 100 includes a jig 110, a mold holder 120, a tape winding device 130, and a control device 140 that controls them, is connected to the server 90 via a network, and is capable of receiving data necessary for producing the lens from the server 90.

The embodiments disclosed herein are examples in every respect and should not be restrictively understood. The scope of the present invention is described not by the above description but by claims, and includes all modifications equivalent to and in claims.

REFERENCE SIGNS LIST

1 Lens mold
2 Spectacle lens
2A Lens convex surface
2B Lens concave surface
2C Edge surface
11 First mold
111 Outer periphery of molding surface $R_1$
12 Second mold
121 Outer periphery of surface opposing molding surface $R_2$
13 Adhesive tape
14 Gap
21 First jig
22 Second jig
211, 221 Placing portion
212, 222 Gripping portion
213, 223 Shaft portion
31 First mold holder
32 Second mold holder
311, 321 Support
312, 322 Suction portion
313, 323 Shaft portion
41, 42 Measurement device
50 Lens-mold forming system
51 Communication medium
60 Spectacle store
61 Ordering terminal
62 Frame-shape measurement device
80 Factory
90 Factory server
91 Processing unit
92 Storage unit
100 Lens-mold forming device
110 Jig
120 Mold holder
130 Adhesive-tape winding device
140 Control device
911 Order processing unit
912 Design-data processing unit
913 Machining-data processing unit
921 Order data
922 Design data
923 Machining data
924 Lens information
925 Frame information
926 Mold information
$R_1$, $R_2$ Molding surface
$F_1$, $F_2$ Reference plane
$A_1$, $A_2$ Reference axis
$O_2$, $O_2$ Reference point
$D_f$, $D_b$ Edge thickness

The invention claimed is:

1. A lens-mold producing method comprising:
    a position and posture determining step of specifying positions and postures, in space coordinates, of a first mold having a molding surface $R_1$ for forming one optical surface of a lens and a second mold having a molding surface $R_2$ for forming the other optical surface by installing the first mold in a first jig that includes a first placing portion having a shape and configuration capable of placing the first mold, and that includes a first gripping portion configured to grip and fix an outer periphery of the first mold, and by installing the second mold in a second jig that includes a second placing portion having a shape and configuration capable of placing the second mold, and that includes a second gripping portion configured to grip and fix an outer periphery of the second mold;
    a mold holding step of rotating and/or inclining, based on the positions and postures in the space coordinates, at least one of the first mold and the second mold, maintaining a rotation angle and/or an inclination angle of a reference plane of the first mold with respect to a reference plane of the second mold, and holding the first mold and the second mold; and
    an assembling step of arranging the molding surface $R_1$ of the first mold and the molding surface $R_2$ of the second mold so as to face each other, fixing outer peripheries of the first mold and the second mold, and assembling a lens-mold.

2. The lens-mold producing method according to claim 1, wherein the mold holding step comprises, after the rotating at least one of the first mold and the second mold using a respective one of the first jig and the second jig, maintaining the rotation angle of the reference plane of the first mold with respect to the reference plane of the second mold, and holding the first mold and the second mold by a first mold holder and a second mold holder respectively.

3. The lens-mold producing method according to claim 1, wherein the mold holding step comprises, after the inclining at least one of the first mold and the second mold using a respective one of the first jig and the second jig, maintaining the inclination angle of the reference plane of the first mold with respect to the reference plane of the second mold, and holding the first mold and the second mold by a first mold holder and a second mold holder respectively.

4. The lens-mold producing method according to claim 1, wherein the mold holding step comprises, after holding the first mold and the second mold by a first mold holder and a second mold holder respectively, rotating at least one of the first mold and the second mold, and maintaining and holding the rotation angle of the reference plane of the first mold with respect to the reference plane of the second mold.

5. The lens-mold producing method according to claim 1, wherein the mold holding step comprises, after holding the first mold and the second mold by a first mold holder and a second mold holder respectively, inclining at least one of the first mold and the second mold, and maintaining and holding the inclination angle of the reference plane of the first mold with respect to the reference plane of the second mold.

6. The lens-mold producing method according to claim 1, further comprising, after the mold holding step, a position determining step of specifying the positions, in the space coordinates, of the first mold and the second mold.

7. The lens-mold producing method according to claim 1, wherein the mold holding step comprises maintaining, by the first mold holder and the second mold holder each having three or more supports, the rotation and/or the inclination of the first mold and the second mold with the respective supports.

8. The lens-mold producing method according to claim 7, wherein the mold holding step comprises driving the respective supports of the first mold holder and the second mold holder and inclining the first mold and the second mold.

9. The lens-mold producing method according to claim 1, wherein the assembling step comprises fixing the outer peripheries of the first mold and the second mold by adhesive tape.

10. The lens-mold producing method according to claim 9, wherein the assembling step comprises arbitrarily setting a winding start position of the adhesive tape that fixes the outer peripheries of the first mold and the second mold.

11. The lens-mold producing method according to claim 1, wherein the assembling step comprises fixing the outer peripheries of the first mold and the second mold by a gasket.

12. The lens-mold producing method according to claim 1, wherein the molding surface $R_1$ is a progressive surface, and the position and posture determining step comprises specifying the progressive surface.

13. A spectacle-lens producing method comprising:
    a filling step of filling a liquid monomer containing a monomer composition into a lens mold assembled by the method according to claim 1; and
    a curing step of polymerizing and curing the filled liquid monomer and casting a spectacle lens.

* * * * *